United States Patent
Clouet

(10) Patent No.: US 7,264,031 B2
(45) Date of Patent: Sep. 4, 2007

(54) SAFETY SUPPORT FOR VEHICLE WHEEL

(75) Inventor: Alain Clouet, Saint-Maurice (FR)

(73) Assignee: Michelin Recherche et Techniques S.A., Granges-Paccot (CH)

( * ) Notice: Subject to any disclaimer, the term of this patent is extended or adjusted under 35 U.S.C. 154(b) by 124 days.

(21) Appl. No.: 11/108,529

(22) Filed: Apr. 18, 2005

(65) Prior Publication Data
US 2005/0236082 A1    Oct. 27, 2005

(30) Foreign Application Priority Data
Apr. 21, 2004    (FR)    ................................ 04 04208

(51) Int. Cl.
*B60C 17/00*    (2006.01)
(52) U.S. Cl. .................. 152/520; 152/516; 152/400
(58) Field of Classification Search .............. 152/399, 152/400, 516, 520, 381.5, 381.6; 301/30, 301/31, 32, 33
See application file for complete search history.

(56) References Cited

U.S. PATENT DOCUMENTS

| | | | |
|---|---|---|---|
| 3,420,288 A * | 1/1969 | Unruh ........................ | 152/158 |
| 4,254,170 A * | 3/1981 | Roullet et al. ............. | 428/36.6 |
| 6,505,660 B2 * | 1/2003 | Heuze et al. ................ | 152/158 |
| 7,055,565 B2 * | 6/2006 | Ishida et al. ................ | 152/158 |
| 2006/0005906 A1 * | 1/2006 | Resare et al. ............... | 152/158 |

FOREIGN PATENT DOCUMENTS

| | | |
|---|---|---|
| DE | 28 42 929 A1 | 4/1980 |
| EP | 0834407 | 4/1997 |
| EP | 0 798 141 A1 | 10/1997 |
| JP | 2002-178727 | 6/2002 |
| WO | WO 03/099591 A1 | 12/2003 |

\* cited by examiner

*Primary Examiner*—Russell D. Stormer
*Assistant Examiner*—Kip Kotter
(74) *Attorney, Agent, or Firm*—Fitzpatrick, Cella, Harper & Scinto

(57) ABSTRACT

In this safety support comprising a segmented ring (6), whose segments (6a, . . . , 6f) are connected by linking means (9), at least one of the linking means (9) comprising at least one male element (26) and at least one female portion (27) suitable for fitting one inside the other by a relative movement of two segments in the circumferential direction of the ring, the at least one linking means (9) also comprises a lever mechanism (28) comprising at least two link arms (29, 31) of different lengths articulated on one another and each at one respective end of the two segments so that the lever mechanism acts so as to bring the two segments closer to one another when the male element (26) is partially engaged in the female portion (27) and when an articulation (38) common to two link arms of the lever mechanism (28) is moved substantially radially relative to the center (C) of the ring (6) in response to an axial movement of the ring relative to the rim.

14 Claims, 9 Drawing Sheets

SAFETY SUPPORT FOR VEHICLE WHEEL

CROSS-REFERENCE TO RELATED APPLICATIONS

This application claims the benefit of French Patent Application No. 04/04208, filed Apr. 21, 2004, which is incorporated herein by reference in its entirety.

BACKGROUND OF THE INVENTION

1. Field of the Invention

The present invention relates to a safety support for a vehicle wheel, that is a support used to support at least partially a tire tread in conditions of low or zero pressure.

2. Description of Related Art

The present invention more particularly relates to a safety support of the type comprising a ring which is intended to be mounted on a rim of a wheel inside a tire and which is subdivided into at least two arced segments having ends which face one another, and several linking means which each connect two ends facing one another of two segments of the ring, at least one of the linking means comprising at least one male element at an end of one segment and at least one female portion at an end of another segment and suitable for receiving the male element via a relative movement of the two segments one relative to the other in the circumferential direction of the ring. A known safety support of this type is for example described in document EP-A-0 798 141.

Relative to the safety supports whose ring is made in a single piece, the safety supports of the segmented ring type offer the advantage of being able to be mounted on a rim with a normal mounting well, therefore not requiring a special rim geometry (of the PAX type, for example) or a two-part rim, such as that shown in FIG. 3 of document EP-A-0 834 407.

On the other hand, the safety supports of the segmented ring type have the disadvantage that their mounting on a wheel rim and their removal relative to the wheel rim are relatively complicated and take a long time to implement. In addition, the known safety supports with segmented ring require a special toolage for their mounting/removal relative to the rim, in particular for the tightening and loosening of the ring segments.

Therefore the present invention aims to provide a safety support of the segmented ring type which can be mounted onto a rim with a usual mounting well and removed from the rim more easily and more rapidly than the known safety supports of the segmented ring type.

SUMMARY OF THE INVENTION

Accordingly, the subject of the present invention is a safety support of the segmented ring type defined in the preamble, characterized in that the at least one linking means also comprises a lever mechanism comprising at least two link arms of different lengths that are articulated on one another and each at a respective end of the two segments to be connected to one another by shafts parallel to the geometric axis of the ring, the lever mechanism acting so as to bring the two facing ends of the two segments closer to one another when the male element is partially engaged in the female portion and when an articulation common to two link arms of the lever mechanism is moved substantially radially relative to the center of the ring in response to an axial movement of the ring relative to the rim.

According to one embodiment of the invention, in a state in which the ends of the segments of the ring are moved away from one another and the ring has a relatively large diameter, the articulation common to two link arms is in the inner space defined by the ring.

Preferably, in a state in which the ends of the segments of the ring are brought closer to one another and the ring has a relatively small diameter, the link arms of the lever mechanism are fully lodged in slots formed in the ends facing one another of the two segments and in a base surface of the segments which is intended to come into contact with the rim.

Preferably, one of the two link arms of the lever mechanism comprises, in the region of the common articulation, a chamfered outer surface so that when the ring is subjected to a force directed parallel to the geometric axis of the ring and the outer chamfered surface comes into contact with a side of a well of a wheel rim, the common articulation is subjected to a force tending to move it radially outwards relative to the center of the ring.

In the case where the safety support ring segments are relatively heavy, in particular in the case of a safety support for a heavy truck wheel, provision is preferably made of at least one retention element suitable for temporarily retaining the male element partially engaged in the female portion until the common articulation has been moved radially to tighten the ring on a wheel rim.

In this case, the retention element may consist of a clip made of spring material, which is generally U-shaped, with two branches which have mutually convergent portions followed by mutually divergent end portions and each of the two segments connected by the lever mechanism comprises, in a lateral face, an opening suitable for receiving one of the two branches of the clip.

In the simplest case, the lever mechanism may comprise two link arms. However, the invention is not limited to a safety support whose lever mechanism comprises two link arms, because this mechanism may comprise for example three link arms, that is a first and a second link arm each articulated at a respective end of the two segments to be connected to one another, and a third link arm, longer than the first and second link arms and articulated on the latter.

According to a variant embodiment of the invention, in particular for a safety support intended to be mounted on a wheel rim of a light vehicle or passenger vehicle, each segment of the ring has a base surface which is suitable for coming into contact with a substantially cylindrical surface of a wheel rim and one of the base surface and of the substantially cylindrical surface supports at least one protrusion suitable for clicking into a groove formed in the other of the base surface and of the substantially cylindrical surface.

A further subject of the invention is a vehicle wheel comprising a rim, a tire and a safety support having one or more of the aforementioned features.

The vehicle wheel may also comprise, in particular in the case of a wheel whose rim has a width (the dimension measured parallel to the axis of rotation of the wheel) markedly greater than the width of the ring of the safety support, in particular in the case of a heavy truck wheel, at least one tire bead locking element which is placed around the rim between a lateral face of the ring of the safety support and a bead of the tire. In this case, the bead locking element may have the shape of a semi-rigid tubular structure ring, which is furnished with a valve used to inflate the tubular structure ring in the presence of a compressed gas in the tire of the wheel, and preventing the tubular structure ring from deflating when there is a rapid pressure drop in the tire.

A further subject of the invention is an assembly consisting of a wheel rim and a safety support intended to be mounted on the wheel rim inside a tire, the rim comprising in particular a mounting well and a substantially cylindrical surface having a diameter greater than the diameter of the mounting well and connected to the latter by an inclined side, the support being intended to support at least partially a tread of the tire in conditions of low or zero pressure and comprising:

a ring which is subdivided into at least two arced segments having ends which face one another, and several linking means which each connect two ends facing one another of two segments of the ring, at least one of the linking means comprising at least one male element at one end of one segment and at least one female portion at an end of another segment and suitable for receiving the male element via a relative movement of the two segments one relative to the other in the circumferential direction of the ring, characterized in that the at least one linking means also comprises:

means of bringing elements together intended to cooperate with the inclined side to bring together the two ends facing one another of the two segments when the male element is partially engaged in the female portion and when the ring is moved axially from a first position facing the mounting well to a second position facing the substantially cylindrical surface.

According to one embodiment of the invention, the means of bringing elements together comprise a lever mechanism comprising at least two link arms of different lengths that are articulated on one another and each at a respective end of the two segments to be connected to one another by shafts parallel to the geometric axis of the ring, the lever mechanism acting so as to bring the two facing ends of the two segments closer to one another when the male element is partially engaged in the female portion and when an articulation common to two link arms of the lever mechanism is moved substantially radially relative to the center of the ring.

BRIEF DESCRIPTION OF THE DRAWINGS

Other objects, features and advantages of the invention will become clearer during the following description of various embodiments given as examples with reference to the appended drawings in which.

DETAILED DESCRIPTION OF THE INVENTION

Figure 1:
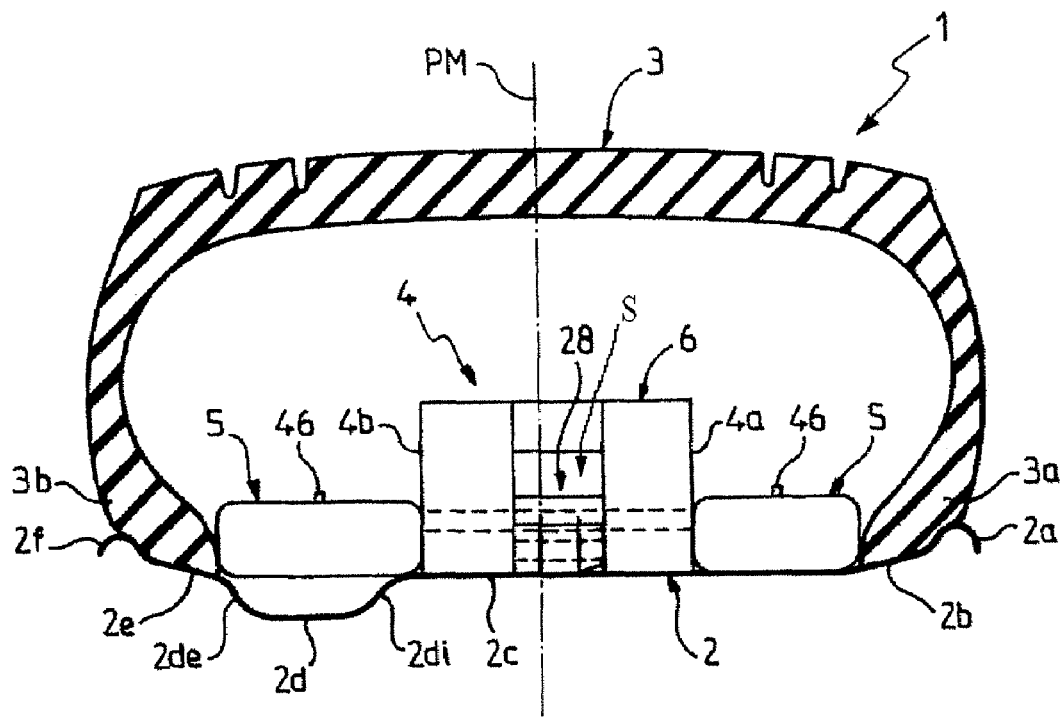
FIG. 1 shows, in schematic manner, an axial section or meridian section of a vehicle wheel fitted with a safety support having a segmented ring according to a first embodiment of the invention.

With reference to FIG. 1, it shows in axial section or meridian section a vehicle wheel 1 comprising a rim 2 onto which are mounted a tire 3 and a safety support 4.

In FIG. 1 (similarly in FIGS. 18, 20 and 23), the right side of the figure corresponds to the inner side of the wheel 1, that is the side which, in service, faces the body of the vehicle, while the left side of the figure corresponds to the outer side of the wheel 1, that is the side that faces the outside of the vehicle.

The rim 2 represented in FIG. 1 has a usual rim profile which comprises successively from the inner side to the outer side, that is from the right side to the left side of the figure, a hook-shaped inner edge 2a, an inner seat 2b for the inner bead 3a of the tire 3, a portion 2c, cylindrical or substantially cylindrical, that supports the safety support 4, a mounting well 2d whose inner side 2di connects smoothly to the portion 2c and whose outer side 2de connects to a seat 2e for the outer bead 3b of the tire 3, and a hook-shaped outer edge 2f. The rim represented in FIG. 1 has a relatively large width, as is for example the case for heavy trucks, vehicles for sport or of a sporting nature or certain top-of-the-range vehicles.

In FIG. 1, the safety support 4 is substantially narrower than the rim 2. In this case, at least one, for example two bead locking elements 5 are also mounted on the rim 2, either side of the safety support 4, between the inner lateral face 4a or outer lateral face 4b of the safety support 4 and the corresponding inner bead 3a or outer bead 3b of the tire 3. Two exemplary embodiments of the locking elements 5 will be described in detail hereinafter.

The bead locking element or elements 5 are not absolutely indispensable and they may be dispensed with in certain cases, in particular when the rim 2 is relatively narrow as is for example the case for certain light vehicles. An example of a wheel without bead locking element will also be described hereinafter.

Figure 2:
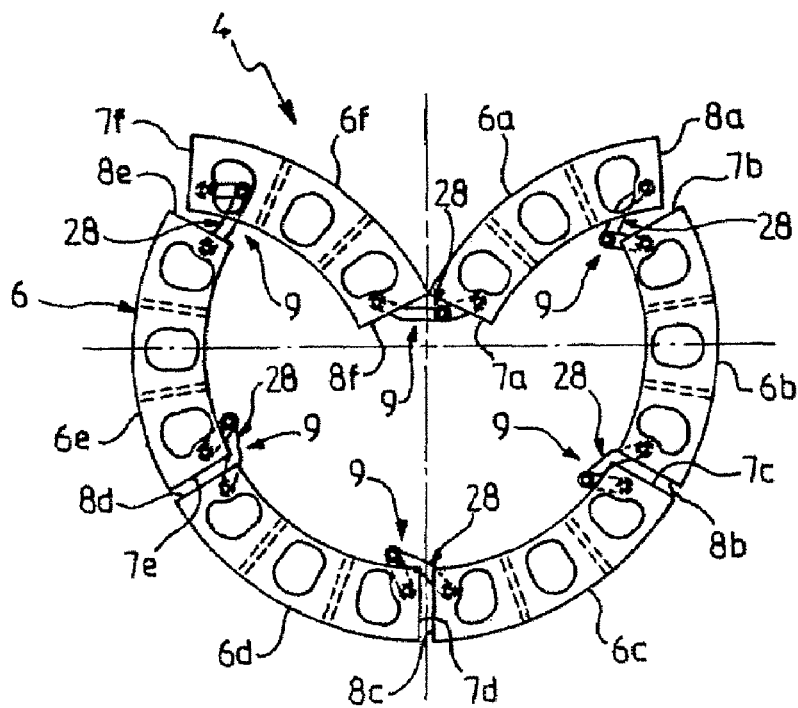
FIG. 2 is a side view of the safety support with segmented ring, in a folded state allowing the introduction of the safety support into the inner space of a tire of which at least one of the two beads is disengaged from the corresponding seat on the wheel rim.

FIG. 2 shows, in the folded state, a safety support 4 of the segmented ring type according to a first embodiment of the invention. The ring 6 of the safety support 4 comprises several arced segments, for example 6 segments 6a to 6f as shown in FIG. 2. All the segments 6a to 6f may be identical as shown in FIG. 2 and, in this case, they have a length corresponding to a 60° arc.

However, the invention is of course not limited to a safety support whose ring is subdivided into six identical segments. Specifically the ring may comprise a number of segments larger or smaller than six, for example two or three segments as in the case of the safety support described in document EP-A-0 798 141, and the segments may have equal lengths or different lengths as is known.

However, since the segments of the safety support ring are usually made of a synthetic material (plastic or elastomer where necessary reinforced with fibers, for example made of polyamide), it is preferable, for reasons of reducing production costs, for all the segments of the ring 6 to be identical and have the same length, because a single mold may then suffice to produce the safety support ring. Likewise, it is preferable for the ring 6 to comprise at least three segments, because that makes it possible to place it in a folded state which facilitates the insertion of the safety support into the tire 3 or the removal of the safety support from the tire when at least the outer bead 3b of the tire 3 is disengaged from the outer seat 2e of the rim 2.

The segments 6a to 6f of the safety support ring 6 have ends 7a, 8a, 7b, 8b, . . . , 7f, 8f, respectively, which, in service, are facing one another in twos, as for example the ends 8c and 7d. The ends facing one another of the segments 6a to 6f are connected to one another by linking means 9. Preferably, all the linking means 9 are identical and one of them will be described in detail hereinafter.

Given that, in the exemplary embodiment represented in FIG. 2, all the segments 6a to 6f of the ring 6 of the safety support 4 are identical and that all the linking means 9 are identical, only the segment 6a will be described hereinafter in detail making reference to FIGS. 3 and 4. As shown in these figures, the segment 6a, made for example of Nylon 6/6 (registered trademark), comprises two lateral portions 11a and 12a, respectively inner and outer, which extend parallel to one another and which are braced by two radial partitions 13a and 14a and, close to the ends 7a and 8a, by bars 15a and 16a.

Preferably, the partitions 13a and 14a have a radial dimension corresponding to that of the lateral portions 11a and 12a of the segment 6a, while the two bars 15a and 16a have a radial dimension smaller than that of the segment 6a and are immediately adjacent to the outer peripheral surface 17a of the segment 6a, that is the surface of the segment that is the furthest from the rim 2. This forms three cavities 18a, 19a and 21a (FIG. 4) between the two lateral portions 11a and 12a of the segment 6a. Each of the two end cavities 18a and 21a opens, in the form of slots (S), both into the corresponding end face 7a or 8a of the segment 6a and into the inner peripheral surface 22a of the segment 6a, that is into its base surface intended to come into contact with the rim 2.

Figure 3:
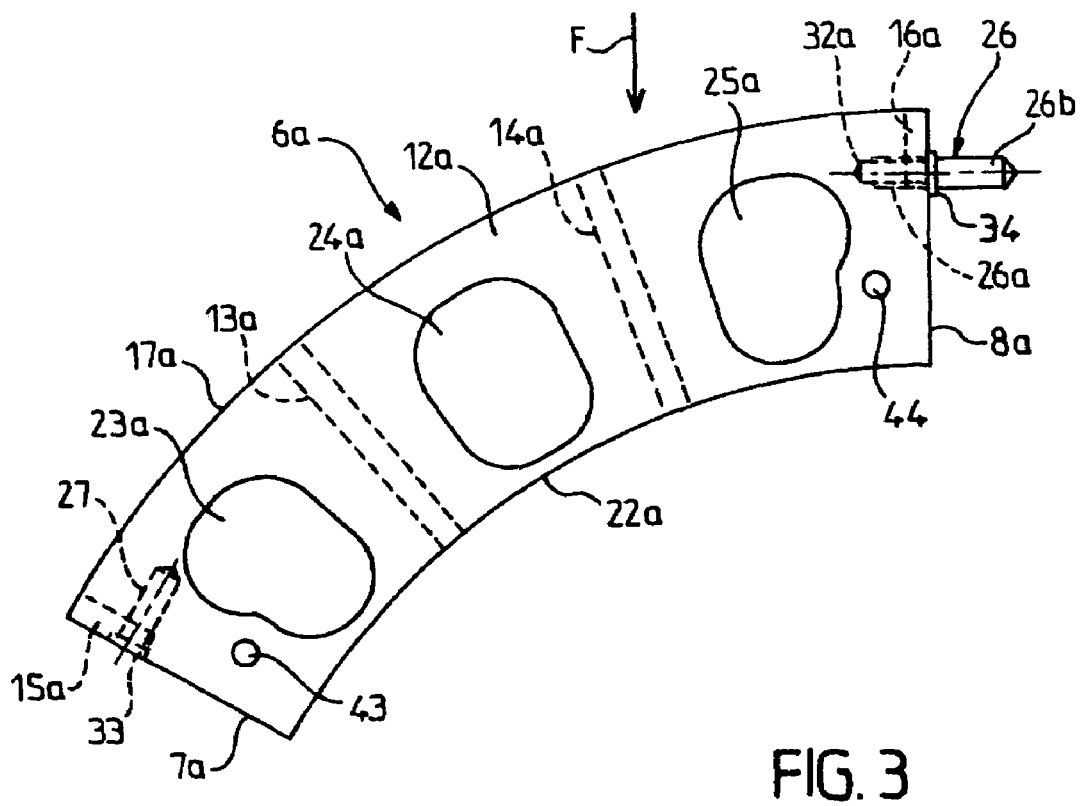
FIG. 3 is a side view, in larger scale, of one of the segments of the safety support ring of FIG. 2.
Figure 4:
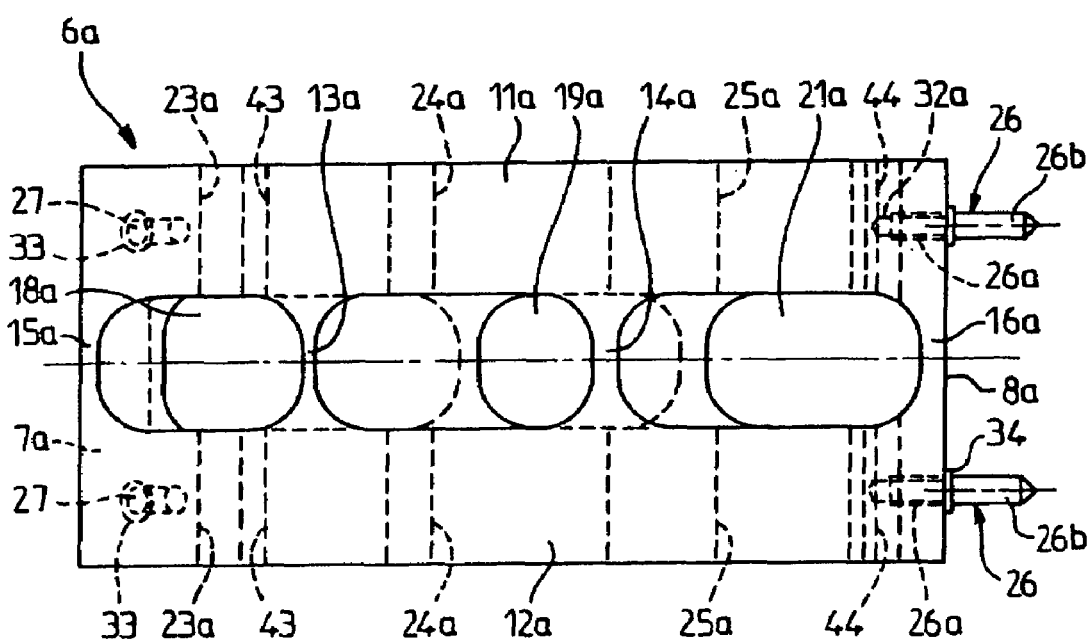
FIG. 4 is a view of the segment of FIG. 3 along the arrow F of that figure.

In addition, as shown in FIGS. 3 and 4, openings 23a, 24a and 25a are formed facing each other in twos in the lateral portions 11a and 12a of the segment 6a. The cavities 18a, 19a and 21a and the openings 23a, 24a and 25a make it possible both to make savings in material and, in service, they make it possible to provide ventilation of the corresponding segment 6a when, in the event of a blowout, the wheel 1 runs on the ground via the safety support 4.

As indicated above, the other segments 6b to 6f of the ring 6 of the safety support 4 have a structure identical to that of the segment 6a. That is why, in FIGS. 15 to 17, the portions of the segment 6f that correspond to those of the segment 6a are indicated by the same reference numbers assigned with the letter f.

Each linking means 9 comprises at least one male element 26 and at least one female portion 27 (not shown in FIG. 2, but visible in FIGS. 3, 4 and 11 to 17) and a lever mechanism 28 comprising at least two link arms 29 and 31 of different lengths.

Figure 15:
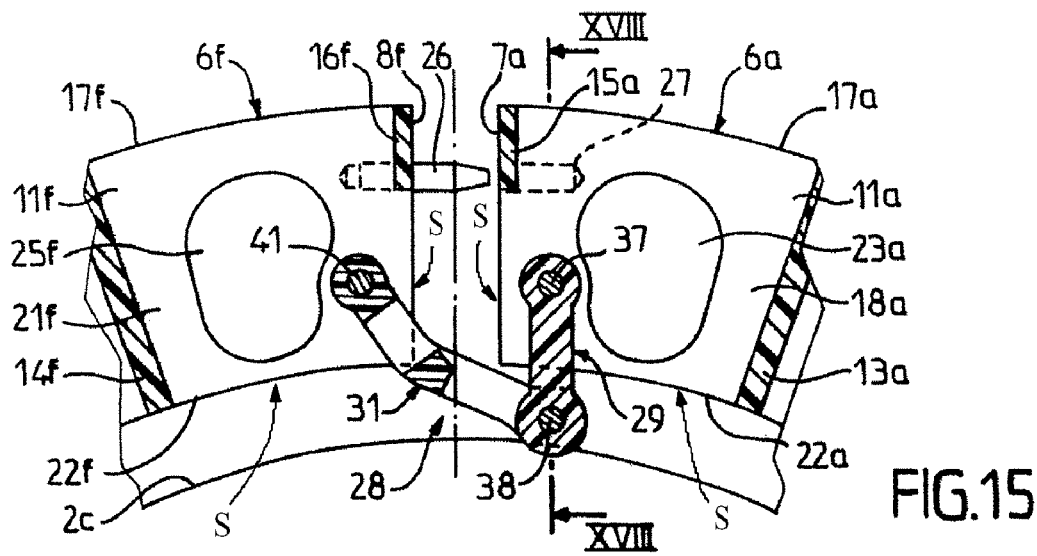
FIGS. 15 to 17 are partial views showing, in larger scale, a detail of the segmented ring, in states corresponding respectively to the phases of FIGS. 12 to 14.
Figure 16:
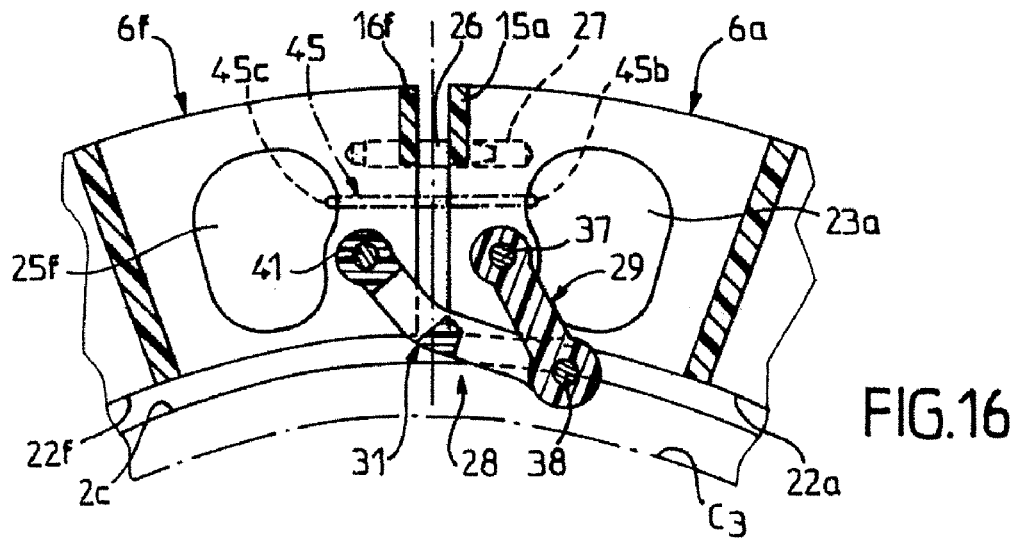
Figure 17:
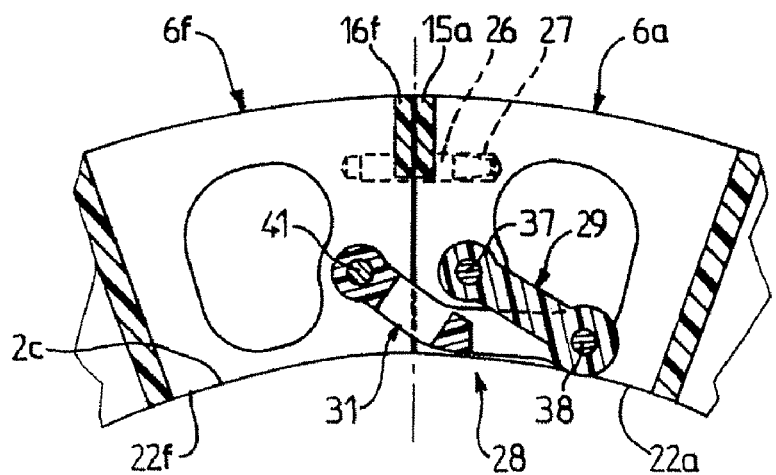

More precisely, each of the segments 6a to 6f of the ring 6 of the safety support 4 comprises preferably two male elements 26 which are attached to one of its end faces, for example the face 8a as shown in FIGS. 3 and 4 for the segment 6a, and two female portions 27 which are formed in the other end face of the segment, for example the face 7a as shown in FIGS. 3 and 4. Each female portion is suitable for receiving a corresponding male element 26 supported by the adjacent end face of another segment of the ring 6, for example the end face 8f of the segment 6f as shown in FIGS. 15 to 17.

Each male element 26 may consist for example of a steel peg comprising a threaded portion 26a which is screwed into a tapped hole 32a in the end face 8a of the segment 6a, and a smooth cylindrical portion 26b, with a conical or frustoconical end, which may be engaged slidingly into one of the two female portions 27 of the next segment, for example the segment 6b following the segment 6a. Each female portion 27 may consist of a blind hole, cylindrical and smooth, which is formed in the end face 7a of the segment 6a when the latter is cast. The entrance of the blind hole of each female portion 27 may be provided with a spot facing 33 suitable for receiving a collar 34 supported by the corresponding male element 26 at the junction between its threaded portion 26a and its smooth portion 26b. As a variant, each female portion 27 could consist of a dowel-shaped metal insert embedded or sunk into the end face 7a of the segment 6a.

Naturally, the number of male elements 26 supported by each segment 6a to 6f is not limited to two, but may be lesser or greater than two according to the value of the width of the segment, that is according to the width of the safety support 4, measured in a direction parallel to the axis of rotation of the wheel 1.

Figure 5:
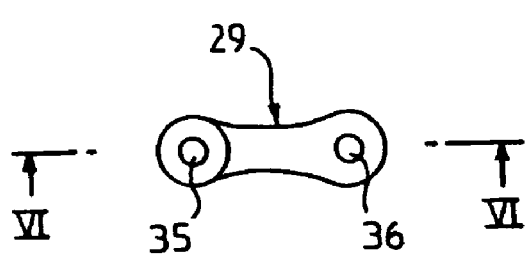
FIG. 5 is a side view of a first link arm forming part of a lever mechanism connecting two successive segments of the safety support ring.
Figure 6:
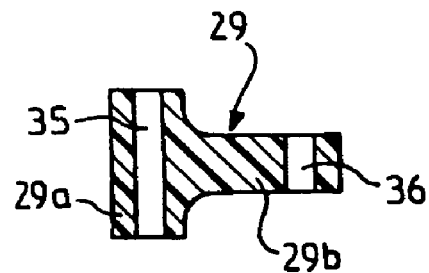
FIG. 6 is a view in section along the line VI-VI of FIG. 5.

Each lever mechanism 28 preferably comprises two link arms 29 and 31, for example molded in a plastic material such as Nylon 6/6, which are represented in detail in FIGS. 5 to 9. As shown in FIG. 5, the link arm 29 has, seen from the side, substantially the shape of a bicycle chain link, with two cylindrical holes 35 and 36 respectively for the articulation shafts 37 and 38 (FIGS. 15 to 17). However, as seen in section through a plane passing through the geometric axes of the two holes 35 and 36 and indicated by the line VI-VI in FIG. 5, the link arm 29 is generally T-shaped as shown in FIG. 6, with a broad portion 29a around the hole 35 and a narrow portion 29b in the remaining portion of the link arm 29.

Figure 7:
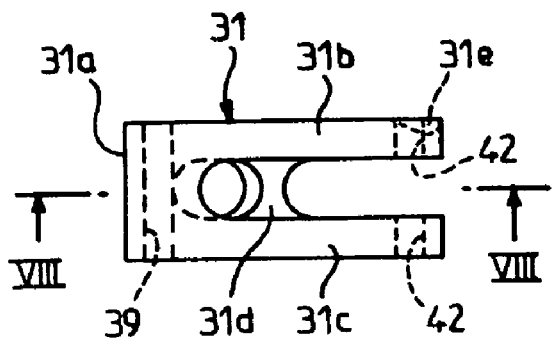
FIG. 7 is a top view of a second link arm forming part of the lever mechanism.

As shown in FIG. 7, the link arm 31 is generally U-shaped, with a base portion 31a and two branches 31b and 31c. Preferably, the two branches 31b and 31c are braced by a bar 31d which is in a single piece with the two branches. A cylindrical hole 39 is formed in the base portion 31a of the link arm 31 for an articulation shaft 41 (FIGS. 15 to 17) and two mutually aligned holes 42 are formed close to the free ends of the branches 31b and 31c to receive the aforementioned articulation shaft 38 which is common to the two link arms 29 and 31.

Figure 18:
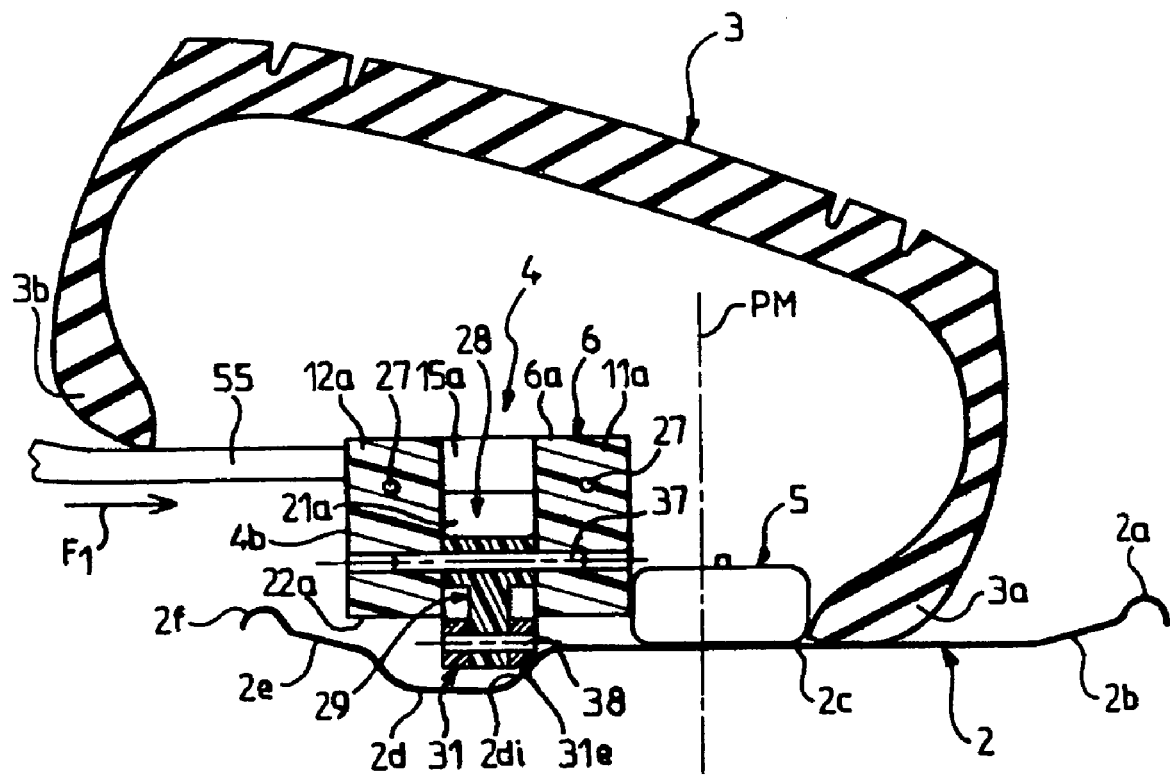
FIG. 18 is an axial section or meridian section of the wheel of FIG. 1 during one of the steps of mounting the safety support onto the wheel rim.

The broad portion 29a of the link arm 29 and the link arm 31 have the same width and the value of this width corresponds to that of the width of the slot formed between the two lateral portions 11a and 12a of the segment 6a as shown in FIG. 18, or to the width of the slot formed between the lateral portions 11f and 12f of the segment 6f, as concerns the portion of the link arm 31 which lies between the latter two lateral portions in the case of the two link arms 29 and 31 connecting the segments 6a and 6f.

As can be seen in FIGS. 11 to 14 and as is yet easier to see in FIGS. 15 to 17, the two link arms 29 and 31 of each lever mechanism 28 are articulated on one another via the articulation shaft 38 which is inserted into the aligned cylindrical holes 36 and 42 of the link arms 29 and 31; the link arm 29 is articulated on one end of one of the segments, for example the segment 6a, by means of the articulation shaft 37 whose ends are housed in aligned cylindrical holes 43 formed in the lateral portions 11a and 12a of the segment 6a close to the end 7a of the latter; and the link arm 31 is articulated on the end of another segment, for example the segment 6f, by means of the shaft 41 whose ends are housed in aligned holes 44 formed in the lateral portions 11f and 12f of the segment 6f, close to the end 8f of the latter.

Figure 11:
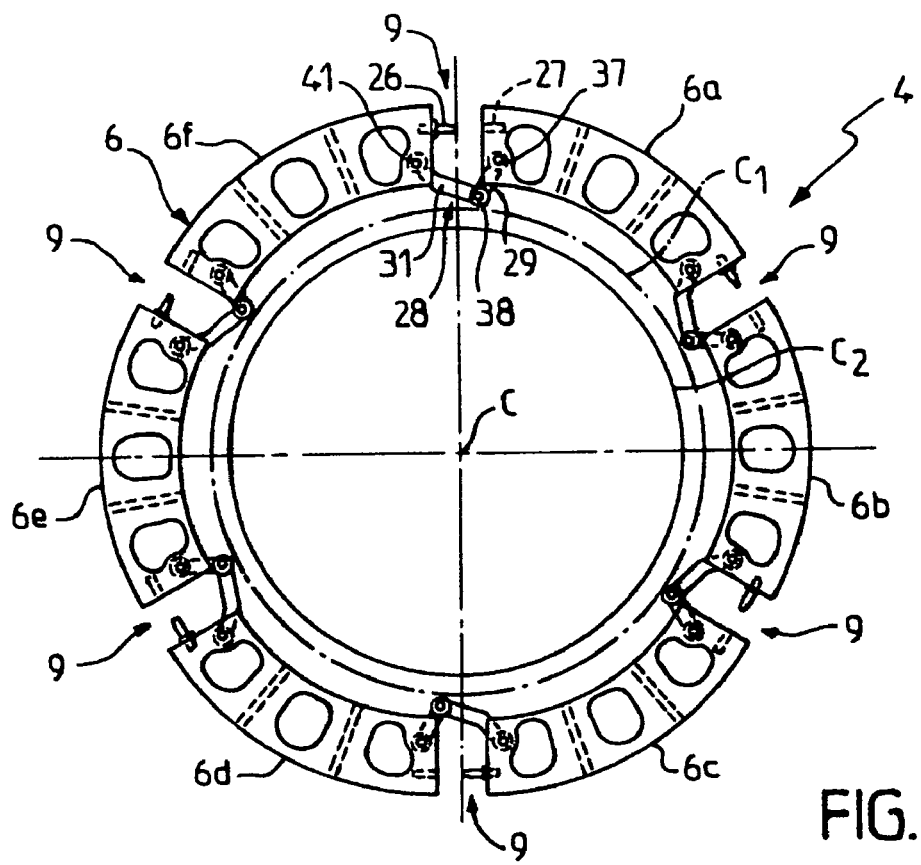
FIGS. 11 to 14 are side views of the safety support with segmented ring, corresponding to successive phases while the ring is tightened onto the wheel rim.
Figure 13:
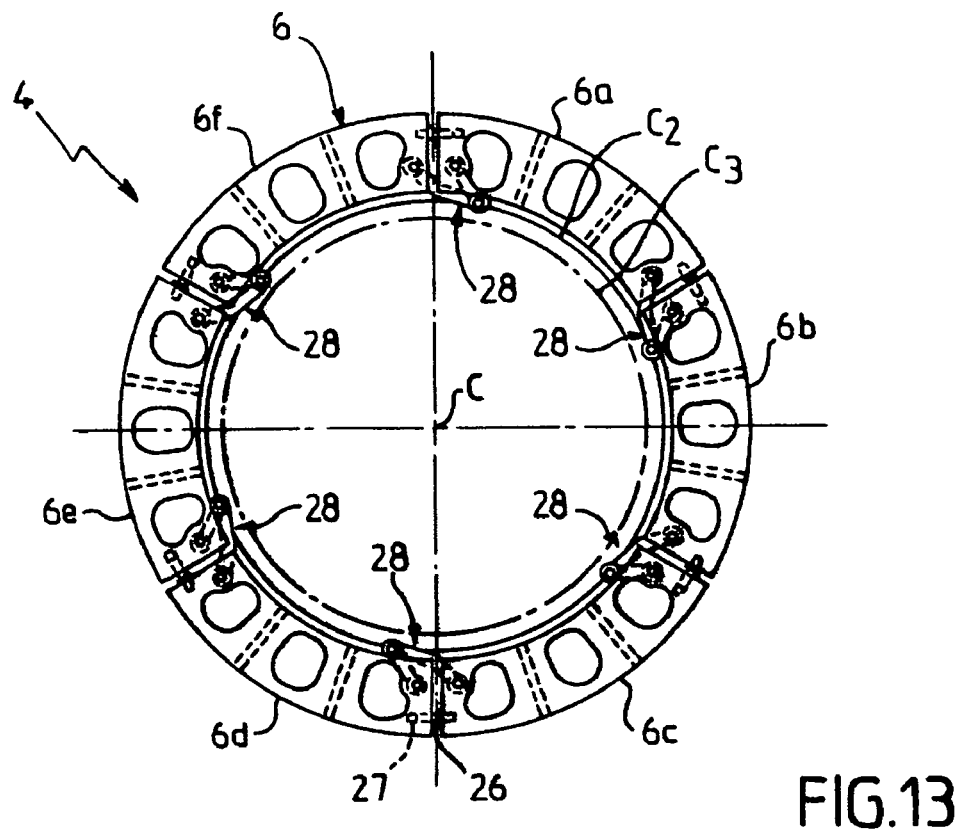
Figure 14:
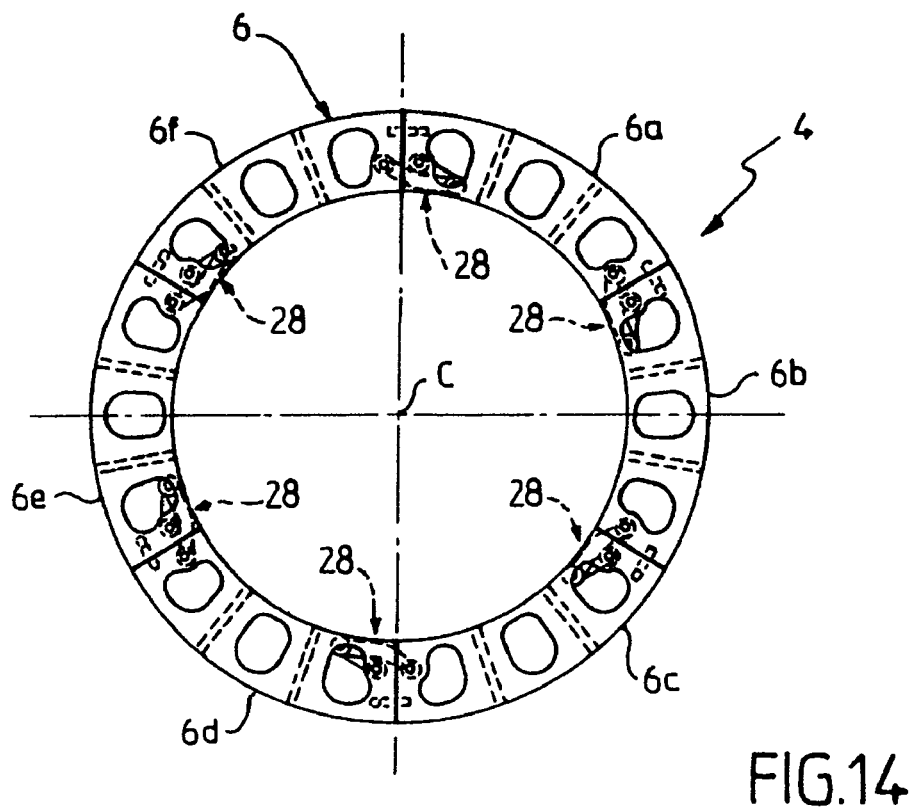

The positions of the holes 43 and 44 on the segments 6a to 6f and the lengths of the link arms 29 and 31 of the lever mechanisms 28 are chosen such that:

a) when the link arms 29 and 31 are deployed in a position such as that shown in FIG. 11, the articulation common to the two link arms 29 and 31 of all the lever mechanisms 28 is at a distance from the center C of the ring 6 of the safety support 4 that is greater than the radius of the circle $C_1$ (shown in dot-and-dash lines in FIG. 11) which corresponds to the maximal diameter of the outer edge 2f of the rim 2;

b) when the link arms 29 and 31 are in a folded state like for example that shown in FIGS. 13 and 16 and when all the male elements are partially engaged in the female portions 27, the articulation common to the two link arms 29 and 31 of all the lever mechanisms 28 is in the inner space defined by the ring 6 of the safety support 4, at a distance from the center C of the ring that is smaller than the radius of the circle $C_2$ (FIG. 13) corresponding to the diameter of the cylindrical portion 2c of the rim 2, but larger than the radius of the circle $C_3$ (shown in dot-and-dash lines in FIG. 13) which corresponds to the diameter of the bottom of the well 2d of the rim 2;

c) when the two link arms 29 and 31 of all the lever mechanisms 28 are in a fully folded state as shown in FIGS. 14 and 17, the link arms 29 and 31 are fully housed in the slots (S) formed between the lateral portions 11 and 12 of the segments of the ring 6 of the safety support 4, the end faces facing one another of the segments 6a to 6f are in contact or almost in contact with one another and the ring 6 of the safety support has a minimal diameter such that the base surfaces 22a to 22f of the segments 6a to 6f can be pressed against the outer surface of the cylindrical or substantially cylindrical portion 2c of the rim 2.

Figure 8:
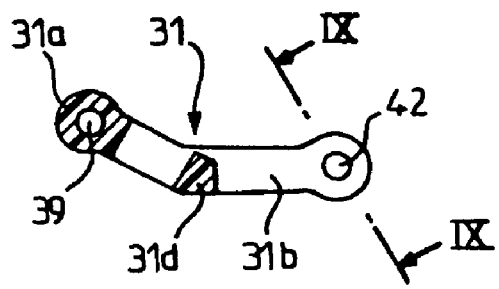
FIG. 8 is a view in section along the line VII-VII of FIG. 7.
Figure 9:
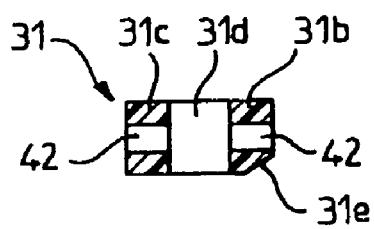
FIG. 9 is a view in section along the line IX-IX of FIG. 8.

As can be seen in FIG. 8, the branches 31b and 31c of the link arm 31 are bent so as not to interfere with the broad portion 29a of the link arm 29 when the link arms are in the position shown in FIGS. 14 and 17. In addition, as shown in FIG. 9, the branch 31b of the link arm 31 has an outer surface chamfered in the region of the articulation common to the two link arms 29 and 31 which is defined by the holes 36 and 42 and by the articulation shaft 38. The chamfered surface 31e may be formed by a flat, but it is preferably conical in shape.

More precisely, the chamfered surface 31e is formed on the branch 31b of the link arm 31 in a region which faces the inner side 2di of the well 2d of the rim 2 during the operations of mounting the safety support 4 onto the rim, as shown in FIG. 18. In these conditions, when the ring 6 of the safety support 4 is subjected to a force directed parallel to the geometric axis of the ring, as indicated by the arrow F1 in FIG. 18, the chamfered surface 31e of each link arm 31 comes into contact with the inner side 2di of the well 2d and the articulation common to the two link arms 29 and 31 of each lever mechanism 28 is then subjected to a force having a component directed radially outwards which tends to move the common articulation radially outwards relative to the center C of the ring 6. The result is that the two link arms 29 and 31 of each lever mechanism 28 pass from the state shown in FIG. 16 to the state shown in FIG. 17, thus causing the ends of the segments of the ring 6 to move together as shown in FIG. 17 and, thereafter, causing a reduction of the inner diameter of the ring 6. Consequently, while placing itself around the cylindrical or substantially cylindrical portion 2c of the rim 2, the ring 6 tightens around the rim 2 and the base surfaces 22a to 22f of the segments 6a to 6f press against the cylindrical or substantially cylindrical portion 2c of the rim.

The safety support 4 may also comprise at least one retention element 45 (FIG. 10), preferably six retention elements in the case where the ring 6 comprises six segments 6a to 6f. During the mounting of the safety support 4 onto the rim 2 of the wheel 1, the retention elements 45 are used to temporarily hold the segments 6a to 6f of the ring 6 in a state of being partially brought together in which the male elements 26 of each segment are partially engaged in the female portions 27 of the corresponding adjacent segment, as will be seen hereinafter.

Figure 10:
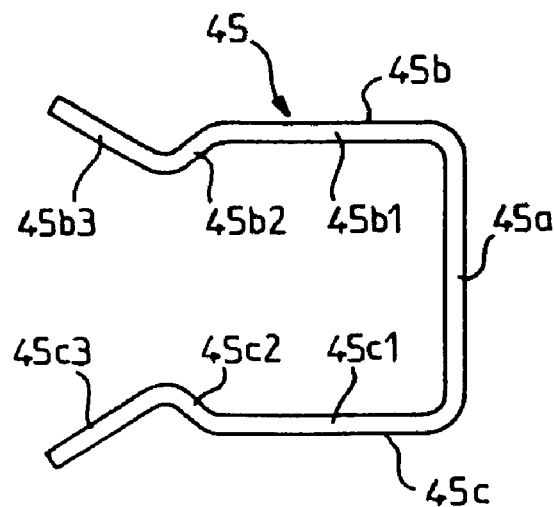
FIG. 10 shows a clip that can be used as a temporary retention element for the mounting of the safety support onto the wheel rim.

As shown in FIG. 10, each retention element 45 may consist of a clip made of a spring material, for example of spring steel wire. The clip 45 is shaped so as to have a general U shape, with a base portion 45a and two branches 45b and 45c which have successively, starting from the base portion 45a, mutually parallel portions 45b1 and 45c1 followed by mutually convergent portions 45b2 and 45c2, which are finally followed by mutually divergent end portions 45b3 and 45c3. The portions 45b1 and 45c1 of the two branches 45b and 45c have a length corresponding approximately to the width of the arced lateral portion of each segment of the ring 6 (for example the arced lateral portion 12a of the segment 6a). The length of the base portion 45a of the clip 45 is chosen so that, when the two branches 45b and 45c of the clip are engaged, for example, respectively in the opening 23a of the segment 6a and in the opening 25f of the segment 6f, as shown in FIG. 16, the two branches 45b and 45c maintain a predefined clearance between the end faces 7a and 8f of the segments 6a and 6f. The above mentioned predefined clearance has a lesser value than the length of the smooth portion 26b of the male elements 26 which protrude on the end face 8f of the segment 6f. For example, the predefined clearance may have a value of 12 mm.

The two bead locking elements 5 represented in FIG. 1 may have the same width or substantially the same width when the safety support 4 must be placed on the rim 2 in a centered or approximately centered position relative to the mid-plane PM of the wheel 1, as shown in FIG. 1. However, the two bead locking elements 5 may have markedly different widths when the ring 6 of the safety support 4 has to be installed on the rim 2 in a markedly off-center position relative to the mid-plane PM, as for example in the position shown in FIG. 20.

However, in all cases, the bead locking elements 5 may have the shape of a semi-rigid tubular structure ring, which is furnished with a valve 46 allowing the inflation of the tubular structure ring in the presence of a compressed gas in the tire 3 of the wheel 1, and preventing the deflation of the tubular structure ring when a rapid fall in pressure occurs in the tire 3. The valve 46 is set to open for example when the pressure difference between the pressure outside the tubular structure of the bead locking element 5, hence the pressure inside the tire 3, and the pressure inside the tubular structure of the element 5 exceeds 0.1 bar ($10^4$ Pa).

Figure 19:
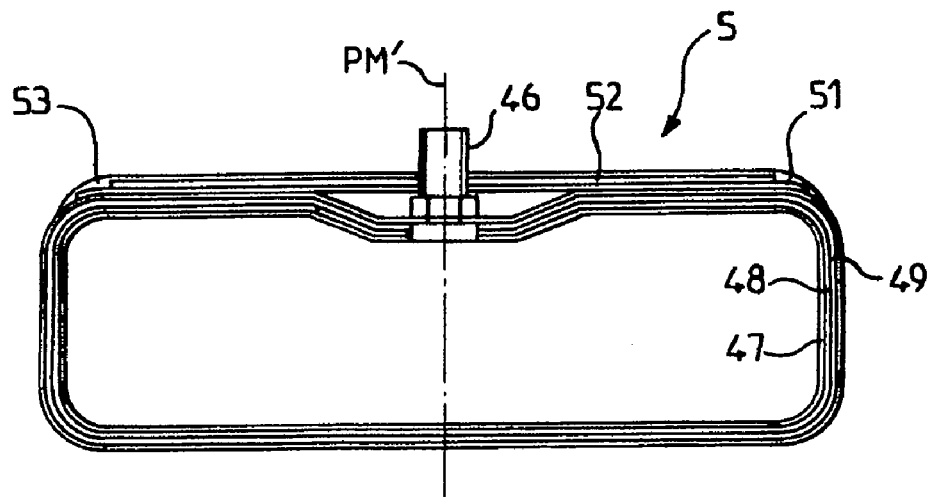
FIG. 19 is an axial section or meridian section of an inflatable tire bead locking element that can be used in the wheel of FIG. 1.

Each ring-shaped bead locking element 5 may have a meridian section of rectangular shape with rounded corners, as shown in FIGS. 1 and 19. Preferably, the tubular structure of the bead locking element 5 has walls exhibiting a multilayer structure, as shown in FIG. 19.

For example, the multi-layer structure may comprise successively, from the inside to the outside of the tubular structure, an inner layer of sealing gum 47 with a high modulus of elasticity, surrounded by a layer 48 braced with wires oriented obliquely, for example at +27° relative to the mid-plane PM' of the meridian section of the tubular structure, and a layer 49 braced with wires oriented obliquely and crossed relative to the wires of the layer 48, for example at an angle of −27° relative to the mid-plane PM'. On its outer peripheral wall which supports the valve 46, the multilayer structure also comprises a layer 51 braced with wires oriented at 90° relative to the mid-plane PM', which is itself banded by a layer 52 braced with metal wires oriented at 0° relative to the mid-plane PM'. Finally, the multilayer structure is covered by an outer layer of protective gum 53. The purpose of the outer banding layer 52 is to reduce the effects of centrifugal force on the outer peripheral wall of the tubular structure of the bead locking element 5 and also to prevent or to limit the deformation of the outer peripheral wall radially outwards under the effect of the pressure of the gas (air) inside the bead locking element 5 when the pressure inside the fire 3 has fallen sharply, for example because of a blowout. In addition, the outer banding layer 52, whose bracing wires are inextensible, has a diameter greater than that of the edge 2f of the rim 2 so that the bead locking element 5 can be installed on the rim.

Note also that the multilayer structure described hereinabove allows the bead locking element 5 to deform radially inwards under the effect of the internal pressure in order to fill at least partially the well 2d of the rim 2, while also accepting an increase in the transverse dimension of the bead locking element 5, that is of its dimension measured parallel to the axis of rotation of the wheel 1, in order to firmly lock the corresponding bead 3a or 3b of the tire 3 against the corresponding edge 2e or 2f of the rim 2.

The operation of mounting the tire 3 and the safety support 4 onto the rim 2 will now be described. First of all, when the tire 3 is lying for example on the ground, the ring 6 of the safety support is placed manually in the state shown in FIG. 2 and it is inserted into the inside of the cavity of the tire 3. Then, the ring 6 of the safety support 4 is developed inside the tire 3 so as to place it in a state similar to that shown in FIG. 11, in which the link arms 29 and 31 of all the lever mechanisms 28 are deployed so that the ring 6 has a maximal diameter in the cavity of the tire 3.

Then, the rim 2 of the wheel is attached, if this has not already been done, to the rim-holder of a conventional device for mounting/removing tires. Then, the tire 3 is placed axially opposite the rim 2 so that the inner bead 3a of the tire is substantially facing the outer edge 2f of the rim 2. Then, using the usual controls of the tire mounting/removal device, the inner bead 3a of the tire is engaged over the outer edge 2f of the rim 2 and is placed on the portion 2c of the rim in an intermediate position corresponding substantially to the mid-plane PM.

Then, the element 5 intended to lock the inner bead 3a is placed inside the cavity of the tire 3 by passing it between the outer edge 2f of the rim 2 and the outer bead 3b of the tire 3, then by passing it between the rim 2 and the ring 6 so that it then slides onto the portion 2c of the rim 2 until the element 5 comes into contact with the inner bead 3a of the tire 3. Then, the ring 6 is placed in an axial position relative to the rim 2, such that the link arms 29 and 31 of all the lever mechanisms 28 are facing the well 2d of the rim 2.

Figure 12:
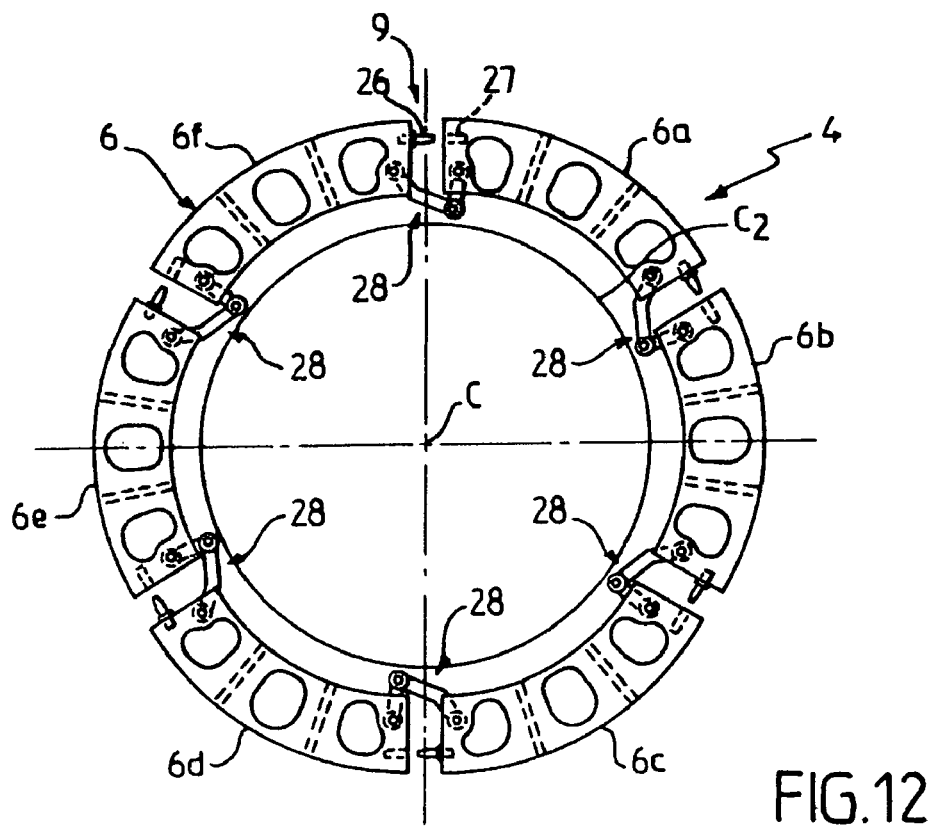

Then, the segments 6a to 6f of the ring 6 are manually brought together two by two in successive and progressive manner by beginning for example with the two segments that are in the bottom portion of the wheel, for example the segments 6d and 6c in FIG. 12, and, after these segments have been brought together, by turning the ring 6 approximately 60° in order to be able to bring together the two other segments, for example the segments 6e and 6d. The manual operations of bringing together the segments 6a to 6f are continued until all the male elements 26 of the segments are partially engaged in the female portions 27 of the corresponding adjacent segments. During these operations, it may be wise, in particular if the segments 6a to 6f have individually a relatively significant weight, to temporarily place clips like the clip 45 shown in FIG. 10, in order to prevent the segments from moving apart from one another under the effect of their own weight while the ring 6 is being turned. At the end of the manual bringing together operations described hereinabove, the ring 6 is in a state like that represented in FIGS. 13 and 16.

Then, a tool 55, called a spade (partially shown in FIG. 18) which forms part of the usual toolage of the tire mounting/demounting device and which can be placed both radially and axially relative to the rim-holder of the device, is placed in contact with the outer face 4b of the safety support 4. The dimension of the spade 55, measured in a direction corresponding to the circumferential direction of the ring 6 is greater than the aforementioned predefined clearance between the segments of the ring 6.

Then, the rim-holder of the tire mounting/removal device is placed in rotation in order to rotate the rim 2 about the axis of rotation of the wheel, then either the rim-holder is moved axially towards the spade 55, or the latter is moved axially towards the rim-holder in order to push the ring 6 axially and as a consequence also the bead locking element 5 and the inner bead 3a towards the inner edge 2a of the rim 2. During this relative axial movement between the rim 2 and the ring 6 of the safety support 4, the chamfered surface 31e of the link arms 31 of the lever mechanisms 28 comes into contact with the inner side 2di of the well 2d of the rim 2. As has already been indicated hereinabove, the result of this is that the articulation common to the two link arms 29 and 31 of each lever mechanism 28 is subjected to a force having a component directed radially outwards, which has the effect of moving the link arms 29 and 31 from the state shown in FIG. 16 to the state shown in FIG. 17. Given that, at this moment, the segments 6*a* to 6*f* cannot be moved radially relative to one another because the male elements 26 are engaged in the female portions 27, the result is that the radial movement outwards of the common articulation of the link arms 29 and 31 causes the final bringing together of the segments 6*a* to 6*f* of the ring 6 and, as a result, the tightening of the latter about the cylindrical portion 2*c* of the rim 2. The relative axial movement between the rim-holder and the spade 55 of the tire mounting/removal device is continued until the ring 6 of the safety support 4 is in the required axial position on the cylindrical or substantially cylindrical portion 2*c* of the rim 2 and the inner bead 3*a* of the tire 3 is in contact with the inner edge 2*a* of the rim 2.

Then, if the clips 45 had been used, they are removed.

Then, the spade 55 is moved axially slightly away from the outer face 4*b* of the safety support 4, to move the outer bead 3*b* of the tire away from the outer edge 2*f* of the rim 2 while leaving just enough room to insert the second bead locking element 5. This second bead locking element 5 is then inserted progressively by hand into the tire cavity 3 by passing it between the outer edge 2*f* of the rim 2 and the outer bead 3*b* of the tire 3, while rotating the rim 2 step by step with the aid of the rotary rim-holder of the tire mounting/removal device. Then, the spade 55 is removed, then the outer bead 3*b* of the tire is put in place in conventional manner on the outer seat 2*e* of the rim 2 by passing it over the edge 2*f* of the rim with the aid of appropriate tools of the tire mounting/removal device.

After that, a visual inspection is carried out to verify whether the tire 3 has been correctly mounted on the rim 2, then the wheel 1 is, where necessary, subjected to a balancing operation and to an inflation operation to inflate the tire 3 and at the same time the bead locking elements 5.

With the safety support 4 according to the invention, in the case of a wheel for a heavy truck, the operations of mounting the safety support 4, the bead locking elements 5 and the fire 3 onto the rim 2 requires less than approximately 15 minutes (without counting any possible balancing and inflation operations) that is a substantially shorter time than is necessary for the mounting of a conventional safety support of the segmented ring type.

The operations of removing the safety support 4 are carried out in the following manner. First of all, the outer bead 3*b* of the tire 3 is disengaged from the outer seat 2*e* of the rim 2 in conventional manner with the aid of appropriate tools of a tire mounting/removal device.

Then, a conical roller forming part of the usual toolage of the tire mounting/removal device is placed in contact with the side of the tire 3 which is on the inner side of the wheel 1 (the right side in FIG. 1). Then, the rim-holder of the tire mounting/removal device is set in rotation and it is moved axially relative to the aforementioned roller and/or the roller is moved axially relative to the rim-holder, in order to cause the inner bead 3*a* of the tire 3, the inner bead locking element 5, the ring 6 of the safety support and the outer bead locking element 5 to slide axially outwards. Then, when the outer bead locking element 5 passes over the outer edge 2*f* of the rim 2, it is manually extracted. Then, the axial movement of the inner bead of the tire and of the inner bead locking element 5 is continued on the cylindrical or substantially cylindrical portion 2*c* of the rim 2 towards the outer edge 2*f* of the latter until the link arms 29 and 31 of the lever mechanisms 28 are opposite the well 2*d* of the rim 2.

At this moment, the link arms 29 and 31 are free to pivot about their shafts 37 and 41 so that their common articulation (shaft 38) enters the well 2*d* of the rim 2, thus allowing the segments 6*a* to 6*f* to move away from one another. Then, the rotation of the rim-holder of the tire mounting/removal device is stopped and, if necessary, the male elements 26 of the segments of the ring 6 are completely retracted from the corresponding female portions 27 by inserting an appropriate tool, for example a screwdriver, between the ends facing one another of the segments and by using the screwdriver as a lever to separate them from one another. In these conditions, the ring 6 may be placed in a state like that shown in FIG. 11, after which the ring 6 and the tire 3 may be removed from the rim 2 with the bead locking element 5 remaining, then the ring 6 and the element 5 may be easily extracted from the cavity of the tire 3. Here again, the operations of removing the safety support may be carried out more simply and more rapidly than in the case of a known safety support of the type with segmented ring.

Figure 20:
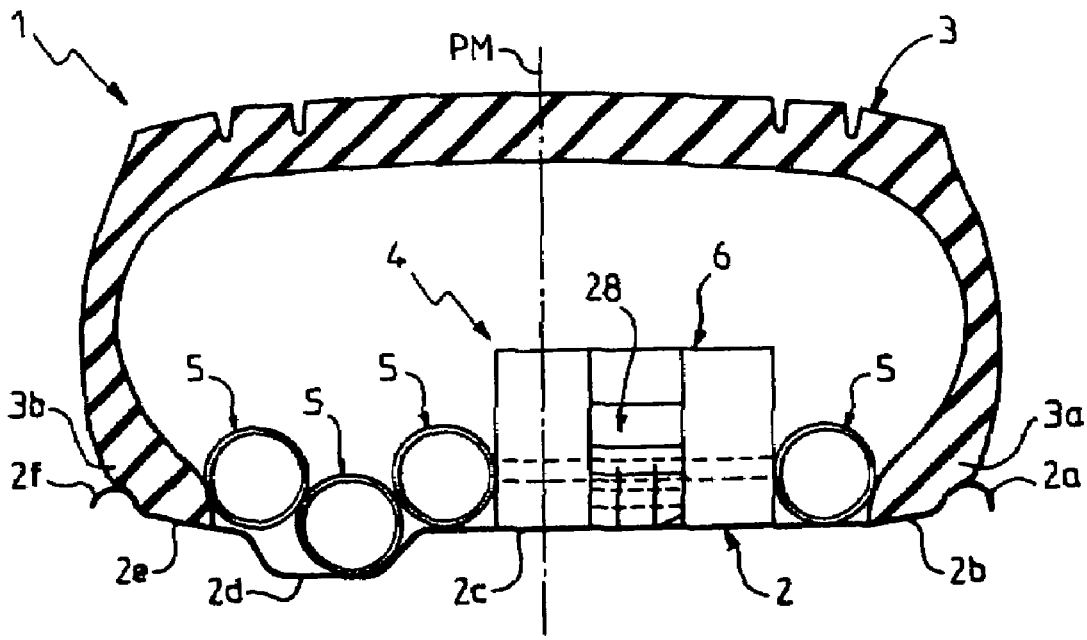
FIG. 20 is a view similar to FIG. 1 showing another embodiment of the inflatable bead locking elements.

FIG. 20 shows another embodiment of the invention in which the safety support 4 is off-center relative to the mid-plane PM of the wheel 1 and offset towards the inner side of the latter. FIG. 20 also shows another embodiment of the bead locking elements 5. Provision is made here for four bead locking elements 5 which are each torus-shaped with circular meridian section.

Figure 21:
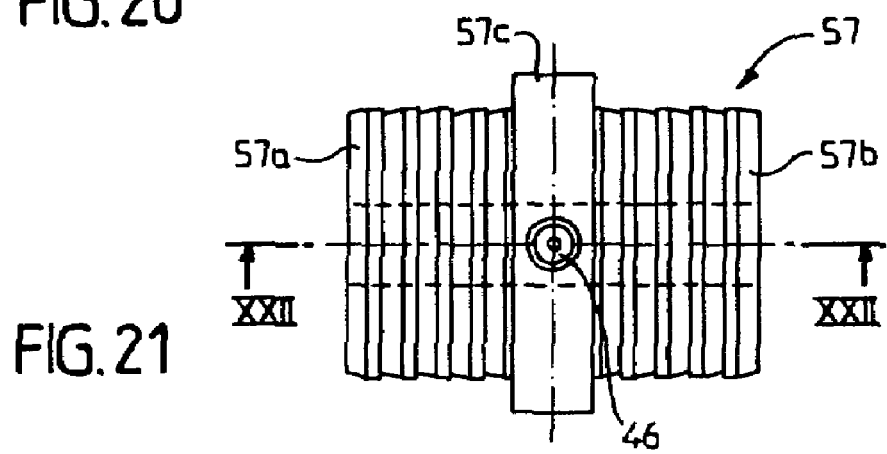
FIG. 21 is a view in side elevation of a tubular connector that can be used for the production of the inflatable bead locking elements shown in FIG. 20.
Figure 22:
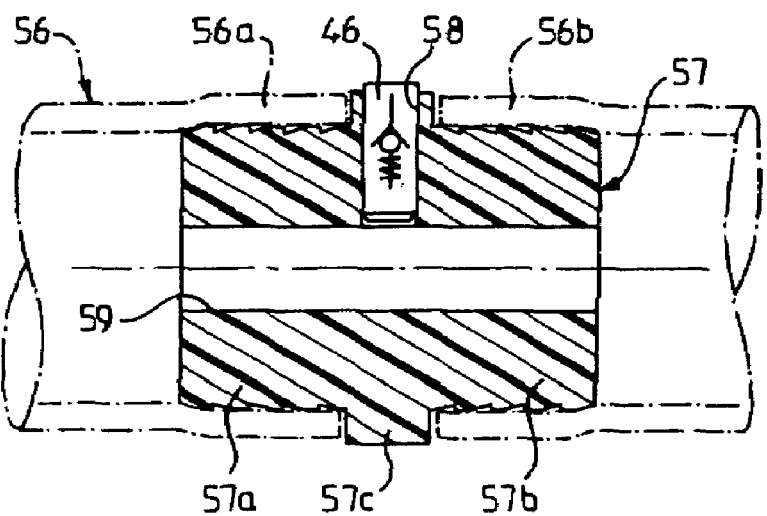
FIG. 22 is a view in section along the line XXII-XXII of FIG. 21.

In this case, each bead locking element 5 may for example consist of a piece of pipe 56 made of braced elastomer, of which both ends 56*a* and 56*b* are connected to one another by a tubular connector 57 (FIGS. 21 and 22). As shown, the connector 57 comprises two male nozzles 57*a* and 57*b* which are respectively fitted into the corresponding ends 56*a* and 56*b* of the pipe 56 and which have an outer surface whose longitudinal profile has a shape similar to the teeth of a saw. The teeth are formed and oriented so as to favor the fitting of each nozzle 57*a* or 57*b* into the corresponding end 56*a* or 56*b* of the pipe 56 and to prevent or at least slow the extraction of each nozzle from the corresponding end of the pipe. The two ends 56*a* and 56*b* of the pipe 56 may be attached respectively to the nozzles 57*a* and 57*b* for example by bonding and/or by binding. Between the two nozzles 57*a* and 57*b*, the connector 57 comprises a collar 57*c*. A hole 58 extends radially into the collar 57*c* and emerges into the inner channel 59 of the connector 57. A valve 46, similar to the valve described above, is fitted into the hole 58 to allow the internal cavity of the pipe 56 to be filled with compressed air.

Figure 23:
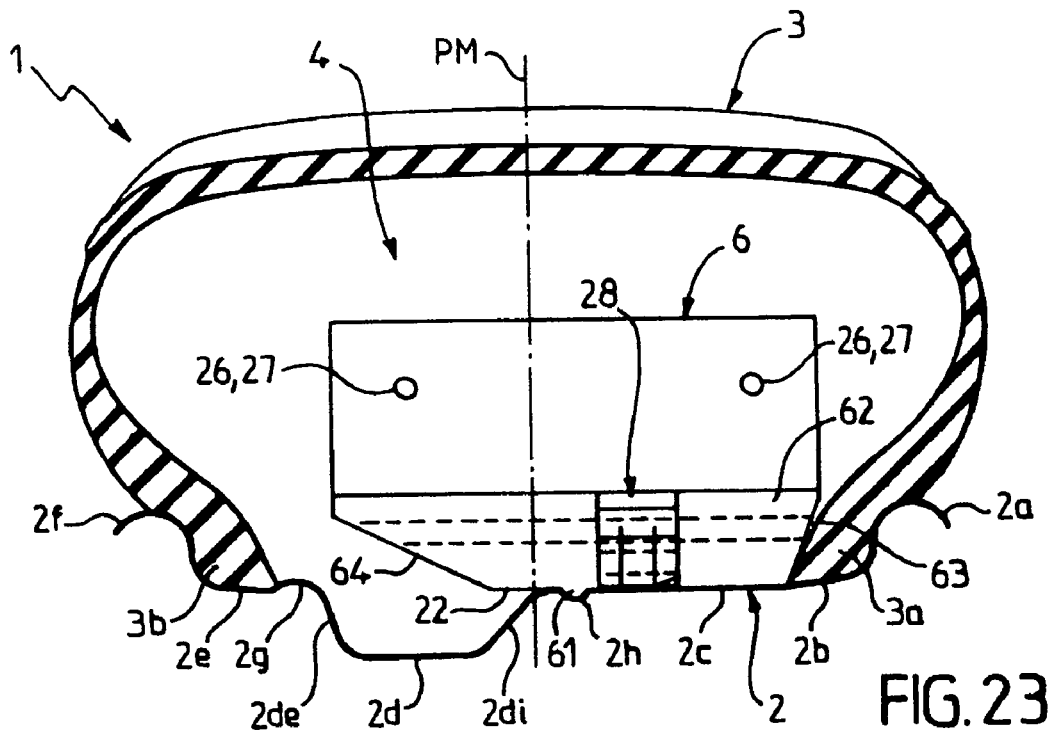
FIG. 23 is an axial section or meridian section of a vehicle wheel fitted with a safety support with segmented ring according to a second embodiment of the invention.

FIG. 23 shows another embodiment of the safety support 4, according to the invention, that can be used in the case of a rim having a width narrower than that shown in FIGS. 1 and 20 and that is more particularly intended for a wheel for a light vehicle. In this case, the rim 2 comprises, between the outer side 2*de* of the well 2*d* and the outer seat 2*e*, an anti-unseating boss 2*g*, called a "hump" by those skilled in the art, to hold the outer bead 3*b* of the tire 3 on the outer seat 2*e* and in contact with the outer edge 2*f* of the rim 2.

In addition, the cylindrical or substantially cylindrical portion 2*c* of the rim 2 comprises, close to the inner side 2*di* of the well 2*d*, a shallow clipping groove 2*h* which has for example a semi-circular cross-section. Each segment of the ring 6 of the safety support 4 has, on its base surface 22, a clipping protrusion 61 which is engaged in the clipping groove 2*h* when the ring 6 of the safety support 4 occupies a desired axial position relative to the rim 2, in order to hold the ring 6 in the desired axial position. In this desired axial position, each segment of the ring 6 presses via its inner side face against the inner bead 3*a* of the tire 3 in order to hold the bead 3*a* on the seat 2*b* of the rim 2 and against the inner edge 2*a* of the rim. Accordingly, the base portion 62 of each segment of the ring 6 may comprise, on the inner side of the wheel 1, a chamfered inner lateral surface 63.

Note that the clipping protrusion 61 may be made in the form of a rib extending continuously in the circumferential direction of the ring 2 over some or all of the length of each segment 6*a* to 6*f* of the ring 6. As a variant, the clipping protrusion may be made in the form of a series of bosses, for example in the form of spherical domes, spaced in the circumferential direction of the ring 6.

According to another variant, the clipping protrusion 61, that is the rib or the series of bosses, may be supported by the substantially cylindrical surface 2*c* of the rim 2, while the clipping groove 2*h* may be formed in the base surface 22*a*, . . . , 22*f* of the segments 6*a*, . . . , 6*f* of the ring 6 of the safety support.

In the embodiment in FIG. 23, each segment of the ring 6 of the safety support 4 has a width such that it extends in the axial direction of the wheel 1 substantially to the transition between the outer side 2*de* of the well 2*d* and the anti-unseating boss 2*g* and therefore entirely or almost entirely covers the well 2*d*. In these conditions, in order to allow the outer bead 3*b* of the tire 3 to penetrate at least locally into the well 2*d* of the rim 2 to allow the removal of the tire, the base portion 62 of each segment of the ring 6 of the safety support 4 is heavily chamfered as shown at 64 in FIG. 23.

For the rest, the ring 6 of the safety support 4 shown in FIG. 23 may be made in a manner similar to that described above concerning the embodiment in FIGS. 1 to 18 (except for the bead locking elements 5 which, in this case, are absent). In particular, the segments of the ring 6 are assembled together by male elements 26 and female portions 27 and by lever mechanisms 28 totally similar to those that have been described hereinabove.

In the embodiments that have been described above, each lever mechanism 28 comprised two link arms 29 and 31. However, the invention must not be limited to these mechanisms comprising two link arms, because, to achieve the purpose that is at the basis of the present invention, a mechanism comprising for example three link arms like the mechanism 28 shown in FIG. 24 which partially corresponds to FIG. 17 of the first embodiment could just as easily be used.

Figure 24:
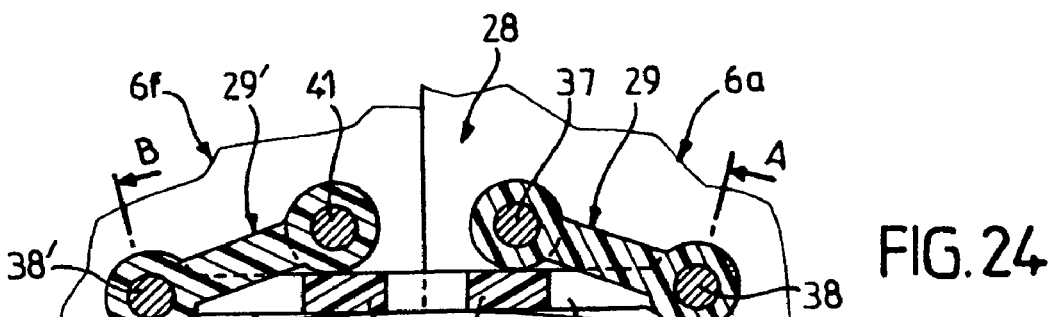
FIG. 24 is a partial view showing a mechanism with three link arms that can be used to connect two successive segments of a segmented ring of a safety support according to the invention.

In FIG. 24, the elements that are identical or play the same role as those in FIG. 17 are identified by the same reference numbers and will not be redescribed in detail. As shown in FIG. 24, the mechanism 28 comprises two identical link arms 29 and 29' of the same length, which are articulated respectively on the shafts 37 and 41 each at a respective end of two segments of the ring of the safety support, for example the segments 6*a* and 6*f*, and a third link arm 65, longer than the two link arms 29 and 29' and articulated on the latter respectively via the shafts 38 and 38'.

Each of the two link arms 29 and 29' may have a shape identical to that shown in FIG. 6. The link arm 65 is generally H-shaped, with two parallel branches 65*a*, only one of which is visible in FIG. 24 and which are braced by one or two cross-members 65*b*. Each of the two articulations defined respectively by the shafts 38 and 38' form a common articulation between the link arm 29 and the link arm 65 or between the link arm 29' and the link arm 65 and these two common articulations play the same role as the common articulation defined by the articulation shaft 38 between the two link arms 29 and 31 of the first embodiment. That is that, when the two common articulations defined by the shafts 38 and 38' are moved radially from the inside to the outside of the ring of the safety support, the segments of the ring are brought together in order to reduce the diameter of the ring and to tighten the latter to press it onto the cylindrical or substantially cylindrical surface of the portion 2*c* of the rim 2.

Preferably, the link arm 65*a*, seen in section along the line A-A and along the line B-B in FIG. 24, has a shape similar to that shown in FIG. 9, that is that one of the parallel branches 65*a* of the link arm 65 has, at its two ends, a chamfered surface similar to the chamfered surface 31*e* shown in FIG. 9, in order to make it easier for the ends of the link arm 65 to slide along the inner side 2*di* of the rim 2 when the safety support 4 is installed on the portion 2*c* of the rim.

Figure 25:
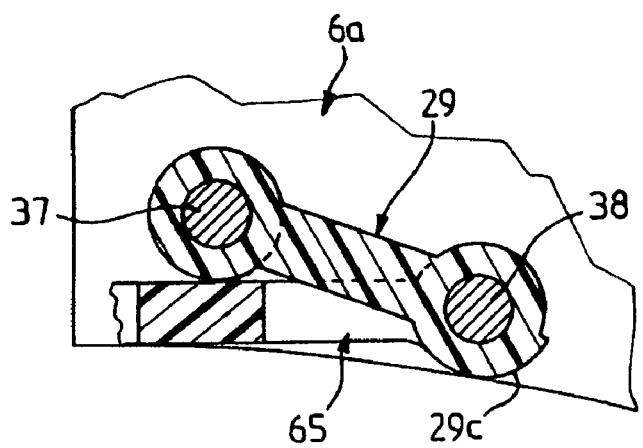
FIG. 25 shows, in larger scale, a portion of the mechanism with three link arms of FIG. 24.

In addition, as shown in FIG. 25, the link arm 29 (as also the link arm 29') may have in the region of the common articulation defined by the shaft 38 (or by the shaft 38' for the link arm 29') an outer curved surface 29*c* which has a spiral profile or which is off-center relative to the shaft 38. In this manner, the tightening of the segments of the ring 6 of the safety support 4 may be amplified by a cam effect given by the surface 29*c* of the link arm 29 in contact with the rim when the link arm 29 pivots about the shaft 37.

The embodiments of the invention that have been described hereinabove have been given as purely indicative, and in no way limiting, examples and that many modifications may easily be made by those skilled in the art without, for all that, departing from the scope of the invention.

For example, in the embodiment in FIG. 25, it is not indispensable for the two link arms 29 and 29' to be of equal lengths, although this is preferable for reasons of standardization.

In addition, it is not indispensable for all the segments of the ring 6 to be connected to one another by linking means comprising, on the one hand, male elements 26 and female portions 27 and, on the other hand, a lever mechanism 28. Specifically, at least two segments of the ring 6 could be connected together permanently by an inextensible but elastically deformable linking means, as described and represented for example in FIGS. 17 and 18 of document EP-A-0 798 141 already mentioned, provided that the safety ring comprises at least two segments connected by linking means including a lever mechanism as described hereinabove.

In addition, in some cases, particularly when the ring of the safety support comprises a small number of segments, it may be necessary to dismantle one of the articulation shafts of the link arms of one of the lever mechanisms 28 in order to open the ring and allow it to be placed in the cavity of the tire or be removed from the cavity of the tire by a movement of the open ring along a substantially helical trajectory.

What is claimed is:

1. A safety support for supporting at least partially a tread of a tire in conditions of low or zero pressure, comprising:
    a ring which is intended to be mounted on a rim of a wheel inside a tire and which is subdivided into at least two arced segments having ends which face one another, and
    a plurality of linking means which each connect two ends facing one another of two segments of the ring, at least one of the linking means comprising at least one male element at an end of one segment and at least one female portion at an end of another segment and suitable for receiving the male element via a relative movement of the two segments one relative to the other in a circumferential direction of the ring, wherein at least one linking means also comprises a lever mechanism comprising at least two link arms of different lengths that are articulated on one another and each at a respective end of the two segments to be connected to one another by shafts parallel to the geometric axis of the ring, the lever mechanism acting so as to bring the two facing ends of the two segments closer to one another when the male element is partially engaged in the female portion and when an articulation common to two link arms of the lever mechanism is moved substantially radially relative to the center of the ring in response to contact of said articulation with the rim during an axial movement of the ring relative to the rim.

2. The safety support according to claim 1, wherein in a state in which the ends of the segments of the ring are moved away from one another and the ring has a relatively large diameter, the articulation common to two link arms is in an inner space defined by the ring.

3. The safety support according to claim 1 or 2, wherein in a state in which the ends of the segments of the ring are brought closer to one another and the ring has a relatively small diameter, the link arms of the lever mechanism are fully lodged in slots formed in the ends facing one another of the two segments and in a base surface of the segments which is intended to come into contact with the rim.

4. The safety support according to claim 1 or 2, wherein one of the two link arms of the lever mechanism comprises, in the region of the common articulation, a chamfered outer surface so that when the ring is subjected to a force directed parallel to the geometric axis of the ring and the outer chamfered surface comes into contact with a side of a well of a wheel rim, the common articulation is subjected to a force tending to move it radially outwards relative to the center of the ring.

5. The safety support according to claim 1 or 2, further comprising at least one retention element suitable for temporarily retaining the male element partially engaged in the female portion until the common articulation has moved radially to tighten the ring on a wheel rim.

6. The safety support according to claim 5, wherein the retention element consists of a clip made of a spring material, which is generally U-shaped, with two branches which have mutually convergent portions followed by mutually divergent end portions and each of the two segments connected by the lever mechanism comprises, in a lateral face, an opening suitable for receiving one of the two branches of the clip.

7. The safety support according to claim 1 or 2, wherein the lever mechanism comprises two link arms.

8. The safety support according to claim 1 or 2, wherein the lever mechanism comprises
 a first and a second link arm, each articulated at a respective end of the two segments to be connected to one another, and
 a third link arm, longer than the first and second link arms and articulated on the latter.

9. The safety support according to claim 1 or 2, wherein each segment of the ring has a base surface which is suitable for coming into contact with a substantially cylindrical surface of a wheel rim and wherein at least one base surface or the substantially cylindrical surface comprises at least one protrusion suitable for fitting into a groove formed in a corresponding portion of the substantially cylindrical surface or a corresponding base surface, respectively.

10. A vehicle wheel comprising:
 a rim,
 a tire and
 a safety support,
 wherein the safety support is a safety support according to claim 1 or 2.

11. The vehicle wheel according to claim 10, wherein at least one tire bead locking element is placed around the rim between a lateral face of the ring of the safety support and a bead of the tire.

12. The vehicle wheel according to claim 11, wherein the bead locking element has the shape of a semi-rigid tubular structure ring, which is furnished with a valve used to inflate the tubular structure ring in the presence of a compressed gas in the tire of the wheel, and prevents the tubular structure ring from deflating when there is a rapid pressure drop in the tire.

13. An assembly comprising:
 a rim of a wheel and of a safety support intended to be mounted on the wheel rim inside a tire, the rim comprising a mounting well and a substantially cylindrical surface having a diameter greater than the diameter of the mounting well and connected to the latter by an inclined side, the support being intended to support at least partially a tread of the tire in conditions of low or zero pressure and comprising:
 a ring which is subdivided into at least two arced segments having ends which face one another, and
 a plurality of linking means which each connect two ends facing one another of two segments of the ring,
 at least one of the linking means comprising
  at least one male element at one end of one segment and
  at least one female portion at an end of another segment and suitable for receiving the male element via a relative movement of the two segments one relative to the other in the circumferential direction of the ring,
 wherein the at least one linking means further comprises:
 means of bringing elements together intended to contact the inclined side to bring together the two ends facing one another of the two segments when the male element is partially engaged in the female portion and when the ring is moved axially from a first position facing the mounting well to a second position facing the substantially cylindrical surface.

14. The assembly according to claim 13, in which the means for bringing elements together comprises a lever mechanism comprising at least two link arms of different lengths that are articulated on one another and each at a respective end of the two segments to be connected to one another by shafts parallel to the geometric axis of the ring, the lever mechanism acting so as to bring the two facing ends of the two segments closer to one another when the male element is partially engaged in the female portion and when an articulation common to two link arms of the lever mechanism is moved substantially radially relative to the center of the ring.

* * * * *

UNITED STATES PATENT AND TRADEMARK OFFICE
CERTIFICATE OF CORRECTION

| | | |
|---|---|---|
| PATENT NO. | : 7,264,031 B2 | Page 1 of 2 |
| APPLICATION NO. | : 11/108529 | |
| DATED | : September 4, 2007 | |
| INVENTOR(S) | : Alain Clouet | |

It is certified that error appears in the above-identified patent and that said Letters Patent is hereby corrected as shown below:

<u>COLUMN 4</u>

Line 35, "invention;" should read --invention; and--.

<u>COLUMN 5</u>

Line 6, "with in" should read --within--.

<u>COLUMN 9</u>

Line 51, "fire" should read --tire--.

<u>COLUMN 11</u>

Line 42, "fire" should read --tire--.

<u>COLUMN 15</u>

Line 17, "wherein" should read --wherein,--.
    Line 22, "wherein" should read --wherein,--.
    Line 54, "comprises" should read --comprises:--.

UNITED STATES PATENT AND TRADEMARK OFFICE
CERTIFICATE OF CORRECTION

PATENT NO. : 7,264,031 B2
APPLICATION NO. : 11/108529
DATED : September 4, 2007
INVENTOR(S) : Alain Clouet It is certified that error appears in the above-identified patent and that said Letters Patent is hereby corrected as shown below:

<u>COLUMN 16</u>

Line 6, "tire" should read --tire.--.
    Line 34, "comprising" should read --comprising:--.
    Line 35, "segment" should read --segment,--.

Signed and Sealed this

Eighteenth Day of March, 2008

JON W. DUDAS
*Director of the United States Patent and Trademark Office*